United States Patent [19]

Eichenauer et al.

[11] Patent Number: 4,800,216

[45] Date of Patent: Jan. 24, 1989

[54] ABS MOLDING COMPOSITIONS OF REDUCED RESIDUAL BUTADIENE CONTENT

[75] Inventors: Herbert Eichenauer, Dormagen; Alfred Pischtschan, Kuerten, both of Fed. Rep. of Germany

[73] Assignee: Bayer Aktiengesellschaft, Leverkusen-Bayerwerk, Fed. Rep. of Germany

[21] Appl. No.: 115,387

[22] Filed: Nov. 2, 1987

[30] Foreign Application Priority Data

Nov. 13, 1986 [DE] Fed. Rep. of Germany ....... 3638704

[51] Int. Cl.$^4$ ............................................. C08L 55/02

[52] U.S. Cl. ..................................... 525/285; 525/73; 525/74; 525/80; 525/83; 525/84; 525/86; 525/302; 525/304

[58] Field of Search ............... 525/285, 301, 302, 310, 525/304, 80, 83, 84, 86, 73, 74

[56] References Cited

U.S. PATENT DOCUMENTS

| | | | |
|---|---|---|---|
| 4,302,378 | 11/1981 | Lindner et al. | 525/74 |
| 4,600,747 | 7/1986 | Zabrocki et al. | 525/74 |
| 4,639,473 | 1/1987 | Wingler et al. | 525/74 |

*Primary Examiner*—Allan M. Lieberman
*Attorney, Agent, or Firm*—Connolly and Hutz

[57] ABSTRACT

The invention relates to ABS molding compositions having a markedly reduced residual butadiene content, even at high processing temperatures.

5 Claims, No Drawings

ABS MOLDING COMPOSITIONS OF REDUCED RESIDUAL BUTADIENE CONTENT

This invention relates to ABS molding compositions having markedly reduced residual butadiene content, even at high processing temperatures.

ABS molding compositions are two-phase plastics of (1) a thermoplastic copolymer of styrene and acrylonitrile in which the styrene may be completely or partly replaced by α-methyl styrene or methyl methacrylate; this copolymer, which is also known as the SAN resin or matrix resin, forms the outer phase;

(2) at least one graft polymer which has been prepared by grafting one or more of the monomers mentioned in (1) onto a butadiene homopolymer or copolymer ("graft base"). This graft polymer ("elastomer phase" or "graft rubber") forms the disperse phase in the matrix resin.

The polymers mentioned in (1) and (2) are produced by known methods, for example by emulsion, solution, mass, suspension or precipitation polymerization or by a combination of these processes.

The unreacted monomers contained through incomplete reaction in the polymer can be removed by degassing after polymerization or during processing (c.f. EP-A No. 0 035 661 for degassing and U.S. Pat. Nos. 2,727,884 and 2,941,935 for monomer removal).

However, a low residual monomer content in the final product by degassing of polymers can only be reliably obtained of the re-formation of monomers (for example through thermal degradation during processing) is prevented.

Whereas, with degassed ABS polymers, the residual monomer content of styrene and acrylonitrile only increases at very high processing temperatures, monomeric butadiene can be generated at relatively low processing temperatures, depending on the microstructure of the butadiene polymer used for the production of the graft rubber.

Numerous methods have been described for the removal of residual styrene or acrylonitrile in polymers by addition of suitable compounds:

Thus, U.S. Pat. Nos. 4,180,486, 4,221,878 and 4,221,905 describe the use of myrcene to reduce the residual styrene and acrylonitrile contents. U.S. Pat. No. 4,124,658 recommends the use of sulfonyl hydrazides for reducing the styrene content, while DE-OS No. 3 215 911 proposes the use of special bicyclic compounds, for example dicyclopentadiene, for the removal of styrene and acrylonitrile.

Suitable compounds the addition of which reduces the residual content of monomeric butadiene have been hitherto unknown.

Accordingly, the object of the present invention is to provide ABS polymer molding compositions which have a low residual butadiene content, even after processing, while the other properties of the polymers remain unaffected.

It has been found that this is achieved by the addition of a compound corresponding to general formula A, B or C:

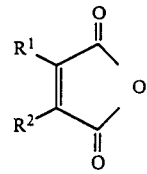

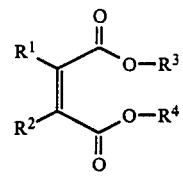

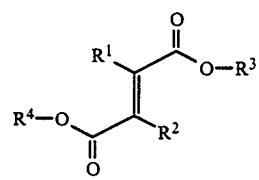

in which
$R^1$ and $R^2$ independently of one another represent H, $C_1$–$C_4$ alkyl and
$R^3$ and $R^4$ independently of one another represent H, $C_1$–$C_8$ alkyl, $C_7$–$C_{10}$ alkaryl, $C_7$–$C_{10}$ aralkyl, phenyl.

The present invention relates to molding compositions of an ABS polymer and a compound corresponding to general formula A, B, C or mixtures thereof in quantities of from 0.05 to 2.0% by weight (based on ABS polymer), preferably in quantities of from 0.1 to 1.5% by weight and more preferably in quantities of from 0.1 to 1.0% by weight.

Most preferred are thermoplastic molding compositions of

I. 100 parts by weight of an ABS polymer having the following composition:
  (1) from 5 to 100% by weight and preferably from 5 to 80% by weight of a graft copolymer prepared by graft polymerization of
  (1.1) from 5 to 90% by weight and preferably from 30 to 80% by weight of a mixture of
  (1.1.1) from 5 to 50% by weight (meth)acrylonitrile, maleic acid anhydride, N-substituted maleic imides or mixtures thereof and
  (1.1.2) from 95 to 50% by weight styrene, α-methyl styrene, nucleus-substituted styrene, methyl methacrylate or mixtures thereof, onto
  (1.2) from 95 to 10% by weight and preferably from 70 to 20% by weight of a rubber having a glass transition temperature $T_G$ of $<10°$ C. in which butadiene is incorporated as a monomer component and II. from 0.05 to 2, preferably 0.1 to 1.5 and most preferably 0.1 to 1.0, parts by weight of compound corresponding to general formula A, B, C or mixtures thereof.

ABS polymers in the context of the invention contain from 5 to 100% by weight and preferably from 5 to 80% by weight of a graft polymer and from 95 to 0% by weight and preferably from 95 to 20% by weight of a thermoplastic copolymer resin.

Graft polymers in the context of the invention are those in which styrene or methyl methacrylate or a mixture of from 95 to 50% by weight styrene, α-methyl styrene, nucleus-substituted styrene, methyl methacrylate or mixtures thereof and from 5 to 50% by weight acrylonitrile, methacrylonitrile, maleic acid anhydride, N-substituted maleic imides or mixtures thereof ("graft monomers") are graft polymerized onto a rubber. Suitable rubbers are virtually any rubbers with glass transition temperatures of $\leq 10°$ C. which contain butadiene in copolymerized form. Examples are polybutadiene, styrene-butadiene copolymers, acrylonitrile-butadiene copolymers, acrylate rubbers containing incorporated structural units derived from butadiene, core/shell acrylate rubbers which contain a crosslinked rubber, such as polybutadiene or a copolymer of butadiene with an ethylenically unsaturated monomer, such as styrene and/or acrylonitrile, as a core surrounded by an acrylate rubber.

Polybutadiene is preferably used.

The graft polymers contain from 10 to 95% by weight and more especially from 20 to 70% by weight rubber and from 90 to 5% by weight and more especially from 80 to 30% by weight graft-copolymerized monomers. The rubbers are present in these graft polymers in the form of at least partly cross-linked particles having an average particle diameter ($d_{50}$) of from 0.05 to 20.0 μm, preferably from 0.1 to 2.0 μm and more preferably from 0.1 to 0.8 μm.

Graft copolymer in this context means the reaction product of the graft polymerization. This reaction product is in fact a mixture of the graft polymer proper wherein the polymerized graft monomers are chemically bonded to the rubber and of a separate copolymer of the graft monomers. The degree of graft, i.e. the weight ratio of grafted monomers to rubber is e.g. 0.1 to 0.8, preferably 0.3 to 0.6. Such graft copolymers can be obtained by radical graft copolymerization of the graft monomers in the presence of the rubbers to be grafted. Processes for producing the graft copolymers in question are known to the art.

The thermoplastic copolymers may be synthesized from the graft monomers or similar monomers, more especially from at least one monomer from the group comprising styrene, α-methyl styrene, halogen styrene, acrylonitrile, methacrylonitrile, methyl methacrylate, maleic acid anhydride, vinyl acetate and N-substituted maleic imide. The coplolymers in question are preferably copolymers of from 95 to 50% by weight styrene, α-methyl styrene, methyl methacrylate or mixtures thereof with from 5 to 50% by weight acrylonitrile, methacrylonitrile, methyl methacrylate, maleic acid anhydride or mixtures thereof. Copolymers such as these are also formed as secondary products during the graft copolymerization reaction. It is standard practice to add separately prepared copolymers in addition to the copolymers contained in the graft polymer. These separately prepared copolymers do not have to be chemically identical with the ungrafted resin components present in the graft polymers.

Suitable separately prepared copolymers are resinlike, thermoplastic and rubber-free and, above all, are copolymers of styrene and/or α-methyl styrene with acrylonitrile, optionally in admixture with methyl methacrylate.

Particularly preferred copolymers consist of from 20 to 40% by weight acrylonitrile and from 80 to 60% by weight styrene or α-methyl styrene. Copolymers such as these are known and may be produced, in particular, by radical polymerization, more especially by emulsion, suspension, solution or mass polymerization. The copolymers preferably have molecular weights $\overline{M}w$ of from 15,000 to 200,00.

The following are examples of suitable compounds corresponding to general formula A, B or C:

Maleic acid anhydride, methyl maleic acid anhydride, dimethyl maleic acid anhydride, ethyl maleic acid anhydride, diethyl maleic acid anhydride, maleic acid, methyl maleic acid, dimethyl maleic acid, ethyl maleic acid, diethyl maleic acid, maleic acid monomethyl ester, maleic acid dimethyl ester, maleic acid ethyl ester, maleic acid diethyl ester, maleic and propyl ester, maleic acid dipropyl ester, maleic acid butyl ester, maleic acid dibutyl ester, methyl maleic acid monomethyl ester, methyl maleic acid dimethyl ester, methyl maleic acid monoethyl ester, methyl maleic acid diethyl ester, methyl maleic acid monobutyl ester, methyl maleic acid dibutyl ester, fumaric acid, methyl fumaric acid, dimethyl fumaric acid, ethyl fumaric acid, diethyl fumaric acid, fumaric acid monomethyl ester, fumaric acid dimethyl ester, fumaric acid ethyl ester, fumaric acid diethyl ester, fumaric acid propyl ester, fumaric acid dipropyl ester, fumaric acid butyl ester, fumaric acid butyl ester, methyl fumaric acid dimethyl ester, methyl fumaric acid diethyl ester, methyl fumaric acid dibutyl ester.

Preferred compounds are maleic acid anhydride, maleic acid, fumaric acid, maleic acid dimethyl ester, fumaric dimethyl ester, methyl maleic acid anhydride, methyl maleic acid, methyl furmaric acid or mixtures thereof.

The compounds of formulae A, B or C can also be used for reducing the amount of residual butadiene in rubbers, for which polymerization butadiene has been used as a monomer. Examples for such polymers are polybutadiene, butadiene/acrylonitrile-copolymers, butadiene/styrene-copolymers, butadiene/butylacrylate-copolymers or copolymers or terpolymers, which contain beside butadiene monomers such as chloroprene, vinylpyridine, esters of (meth)acrylic acid.

In addition to the compounds according to the invention, the molding compositions may contain the usual additives, such as pigments, fillers, statilizers, antistatic agents, lubricants, mold release agents, flameproofing agents and the like.

The present invention also relates to a process for the production of ABS polymer molding compositions which have a low residual butadiene content, even after processing to the final molding.

To this end, from 0.05 to 2.0% by weight (based on the molding composition), preferably from 0.1 to 1.5% by weight and more preferably from 0.1 to 1.0% by weight of a compound corresponding to general formula A, B or C is added to the ABS polymer consisting of the components described above and thoroughly mixed therewith at elevated temperatures, more especially at $T = 100°$ C. to 280° C.

The ABS polymer and the additive (A), (B) or (C) are mixed in standard mixing units, for example in kneaders, internal mixers, on roll stands, in screw mixers or extruders.

The residence times during the mixing process may vary between 10 seconds and 30 minutes, depending on the intensity of mixing.

The moulding compositions obtained can be used for all known ABS applications. Their advantage is reduced content of monomers, especially of butadiene.

EXAMPLES

Polymers used:

(A) Graft rubber consisting of 50% by weight of polybutadiene as grafting base having an average particle diameter ($d_{50}$) of 0.4 μm onto which 36% by weight styrene and 14% by weight acrylonitrile have been grafted.

(B) Graft rubber consisting of 50% by weight of polybutadiene as grafting base having an average particle diameter ($d_{50}$) of 0.1 μm, onto which 36% by weight styrene and 14% by weight acrylonitrile have been grafted.

(C) Styrene/acrylonitrile copolymer of 72 weight percent of styrene and 28 weight percent of acrylonitrile having weight average molecular weight $\overline{M}_w$ of approx. 80,000 and a heterogeneity index $U = \overline{M}_w/\overline{M}/_n - 1 \leq 2$.

(D) Styrene/acrylonitrile copolymer of 72 weight percent of styrene and 28 weight percent of acrylonitrile having an weight average molecular weight $\overline{M}_w$ of approx. 115,000 and a heterogeneity index $U = \overline{M}_w/\overline{M}_n - 1 \leq 2$.

(E) α-methyl styrene/acrylonitrile copolymer of 72 weight percent of α-methyl styrene and 28 weight percent of acrylontrile having an weight average molecular weight $\overline{M}_w$ of approx. 77,000 and a heterogeneity index $U = \overline{M}_w/\overline{M}_n - 1 \leq 2$.

EXAMPLES 1 to 8

The quantities of maleic acid and fumaric acid indicated in Table 1 were mixed for 3 to 5 minutes at 180° to 200° C. with a mixture of 25 parts by weight polymer A, 25 parts by weight polymer B and 50 parts by weight polymer C and 2 parts by weight pentaerythritol tetrastearate in an internal mixer, after which the resulting mixture was granulated and subsequently injection-molded at 240° C., 260° C. and 280° C. (75 second cycle).

EXAMPLES 9 to 20

The quantities of maleic acid anhydride indicated in Table 2 were mixed for 3 to 5 minutes at 196° to 214° C. in an internal mixer with a mixture of 50 parts by weight polymer A, 50 parts by weight polymer D and 2 parts by weight pentaerythritol tetrastearate (Examples 9 to 14) and with a mixture of 17.5 parts by weight polymer A, 17.5 parts by weight polymer B, 65 parts by weight polymer E and 2 parts by weight pentaerythritol tetrastearate (Examples 15 to 20), after which the resulting mixture was granulated and subsequently injection-molded at 220° C., 260° C. and 280° C. (75 second cycle).

EXAMPLES 21 to 30

The compounds indicated in Table 3 were mixed in the quantities indicated for 4 to 5 minutes at 192° to 197° C. with a mixture of 50 parts by weight polymer A, 50 parts by weight polymer D and 2 parts by weight pentaerythritol tetrastearate in an internal mixer, after which the resulting mixture was granulated and subsequently injection-molded at 240° C. and 260° C. (75 second cycle).

As can be seen from Tables 1 to 3, the addition of compounds corresponding to general formula A, B or C leads to products having a distinctly reduced residual butadiene content.

The other properties of the ABS polymers, such as for example notched impact strength, hardness and deflection temperature, were not affected by the presence of compound A, B or C.

TABLE 1

| Example no. | Maleic acid [parts by weight] | Fumaric acid [parts by weight] | Quantity of butadiene in granulate | Quantity of butadiene in injection-molded part at a processing temperature of | | |
|---|---|---|---|---|---|---|
| | | | | 240° C. | 260° C. | 280° C. |
| 1 (Comp.) | — | — | 5.1 ppm | 3.8 ppm | 5.7 ppm | 11.5 ppm |
| 2 | 0.05 | — | 4.1 ppm | 2.1 ppm | 4.4 ppm | 12.1 ppm |
| 3 | 0.1 | — | 3.2 ppm | 0.7 ppm | 3.8 ppm | 9.4 ppm |
| 4 | 0.3 | — | 1.1 ppm | 0.4 ppm | 2.9 ppm | 10.0 ppm |
| 5 | 0.5 | — | <0.1 ppm | <0.1 ppm | 0.1 ppm | 1.1 ppm |
| 6 | 1.5 | — | <0.1 ppm | 10.1 ppm | <0.1 ppm | 1.2 ppm |
| 7 | — | 0.5 | 1.6 ppm | 0.2 ppm | 0.2 ppm | 0.8 ppm |
| 8 | — | 1.5 | 0.9 ppm | <0.1 ppm | <0.1 ppm | 0.5 ppm |

TABLE 2

| Example no. | Maleic acid anhydride [parts by weight] | Quantity of butadiene in granulate | Quantity of butadiene in injection-molded part at a processing temperature of | | |
|---|---|---|---|---|---|
| | | | 220° C. | 260° C. | 280° C. |
| 9 (Comp.) | — | 1.5 ppm | 2.0 ppm | 2.6 ppm | 4.8 ppm |
| 10 | 0.1 | 0.3 ppm | 0.3 ppm | 1.1 ppm | 4.8 ppm |
| 11 | 0.25 | <0.1 ppm | <0.1 ppm | 0.7 ppm | 2.9 ppm |
| 12 | 0.5 | <0.1 ppm | <0.1 ppm | 0.4 ppm | 2.7 ppm |
| 13 | 0.75 | <0.1 ppm | <0.1 ppm | 0.2 ppm | 2.9 ppm |
| 14 | 1 | <0.1 ppm | <0.1 ppm | 0.2 ppm | 2.3 ppm |
| 15 (Comp.) | — | 2.5 ppm | 2.3 ppm | 2.0 ppm | 3.1 ppm |
| 16 | 0.1 | 0.3 ppm | 0.2 ppm | 1.0 ppm | 2.5 ppm |
| 17 | 0.25 | <0.1 ppm | <0.1 ppm | 0.5 ppm | 1.9 ppm |
| 18 | 0.5 | <0.1 ppm | <0.1 ppm | 0.3 ppm | 1.4 ppm |
| 19 | 0.75 | <0.1 ppm | <0.1 ppm | 0.2 ppm | 1.2 ppm |
| 20 | 1 | <0.1 ppm | <0.1 ppm | 0.2 ppm | 1.1 ppm |

TABLE 3

| Example no. | Maleic acid diethyl ester [parts by weight] | Maleic acid di-n-butyl ester [parts by weight] | Fumaric acid dimethyl ester [parts by weight] | Quantity of butadiene in granulate | Quantity of butadiene in injection molded part at a processing temperature of 240° C. | Quantity of butadiene in injection molded part at a processing temperature of 260° C. |
|---|---|---|---|---|---|---|
| 21 (Comp.) | — | — | — | 1.5 ppm | 2.6 ppm | 4.8 ppm |
| 22 | 0.25 | — | — | 1.0 ppm | 1.4 ppm | 3.0 ppm |
| 23 | 0.5 | — | — | 1.3 ppm | 1.3 ppm | 2.3 ppm |
| 24 | 1.0 | — | — | 1.1 ppm | 0.9 ppm | 2.1 ppm |
| 25 | — | 0.25 | — | 1.1 ppm | 1.4 ppm | 2.0 ppm |
| 26 | — | 0.5 | — | 1.0 ppm | 1.2 ppm | 1.7 ppm |
| 27 | — | 1.0 | — | 1.0 ppm | 0.8 ppm | 1.5 ppm |
| 28 | — | — | 0.25 | 1.0 ppm | 0.8 ppm | 1.8 ppm |
| 29 | — | — | 0.5 | 1.0 ppm | 0.4 ppm | 1.1 ppm |
| 30 | — | — | 1.0 | 0.6 ppm | 0.2 ppm | 0.5 ppm |

We claim:

1. Thermoplastic molding compositions comprising 100 parts by weight of an ABS polymer and from 0.05 to 2.0 parts by weight of a compound corresponding to general formula A, B or C or mixtures thereof

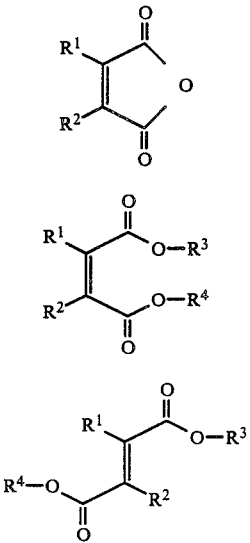

in which
$R^1$ and $R^2$ independently of one another represent H, or $C_1$-$C_4$ alkyl,
$R^3$ and $R^4$ independently of one another represent H, $C_1$-$C_8$ alkyl, $C_7$-$C_{10}$ alkaryl, $C_7$-$C_{10}$ aralkyl, or phenyl,
and the ABS polymer is 5 to 100% by weight of a graft copolymer and 95 to 0% by weight of a thermoplastic copolymer resin wherein the graft copolymer is a 10 to 95% by weight of a butadiene-containing rubber having a gross transition temperature of 10° C. or less onto which is grafted 90 to 5% by weight of graft monomers which are styrene or methyl methacrylate or a mixture of from 95 to 50% by weight styrene, α-methyl styrene, nucleus-substituted styrene, methyl methacrylate or mixtures thereof and from 5 to 50% by weight acrylonitrile, methacrylonitrile, maleic acid anhydride, N-substituted maleic imides or mixtures thereof and the thermoplastic resin is a polymer of one or more monomers selected from said graft monomers or mixtures thereof.

2. Thermoplastic molding compositions according to claim 1, of

I. 100 parts by weight of an ABS polymer having the following composition:
  (1) from 5 to 80% by weight of a graft copolymer prepared by graft polymerization of
    (1.1) from 30 to 80% by weight of a mixture of
      (1.1.1) from 5 to 50% by weight (meth)acrylonitrile, maleic acid anhydride, N-substituted maleic imides or mixtures thereof and
      (1.1.2) from 95 to 50% by weight styrene, α-methyl styrene, nucleus-substituted styrene, methyl methacrylate or mixtures thereof, onto
    (1.2) from 70 to 20% by weight of a rubber having a glass transition temperature $T_G$ of $\leq 10°$ C. in which butadiene is incorporated as a monomer component
  and
II. from 0.05 to 2 parts by weight of compound corresponding to general formula A, B or C or mixtures thereof

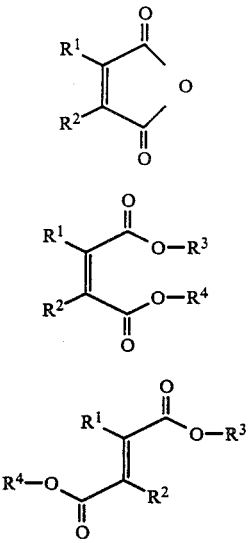

in which
$R^1$ and $R^2$ independently of one another represent H, $C_1$-$C_4$ alkyl,
$R^3$ and $R^4$ independently of one another represent H, $C_1$-$C_8$ alkyl, $C_1$-$C_8$ alkyl, $C_7$-$C_{10}$ alkaryl, $C_7$-$C_{10}$ aralkyl, phenyl.

3. Thermoplastic molding compositions as claimed in claim 1, wherein maleic acid anhydride, maleic acid, fumaric acid, maleic acid dimethyl ester, fumaric acid dimethyl ester, methyl maleic acid anhydride, methyl maleic acid, methyl fumaric acid or mixtures thereof are used as compound A, B or C.

4. A process for the production of ABS molding compositions according to claim 1, wherein from 0.05 to 2.0 parts by weight (based on 100 weight parts ABS polymer) of a compound corresponding to general formula A, B or C is added to an ABS polymer and thoroughly mixed therewith at a temperature of from 100° C. to 280° C.

5. A process for the production of ABS molding compositions as claimed in claim 1, wherein maleic acid anhydride, maleic acid, fumaric acid, maleic acid dimethyl ester, fumaric acid dimethyl ester, methyl maleic acid anhydride, methyl maleic acid, methyl fumaric acid or mixtures thereof are used as compound A, B or C.

* * * * *